United States Patent [19]

Takahashi et al.

[11] Patent Number: 5,012,676
[45] Date of Patent: *May 7, 1991

[54] GAS RATE SENSOR SYSTEM

[75] Inventors: Tsuneo Takahashi; Tomoyuki Nishio; Masayuki Ikegami; Takahiro Gunji, all of Saitama, Japan

[73] Assignee: Honda Giken Kogyo Kabushiki Kaisha, Tokyo, Japan

[*] Notice: The portion of the term of this patent subsequent to Aug. 28, 2007, has been disclaimed.

[21] Appl. No.: 295,839

[22] Filed: Jan. 11, 1989

[30] Foreign Application Priority Data

Jan. 13, 1988 [JP] Japan .................. 63-5394

[51] Int. Cl.⁵ .............................................. G01P 9/00
[52] U.S. Cl. ...................... 73/497; 73/516 LM
[58] Field of Search ................. 73/497, 505, 516 LM, 73/516 R, 515; 364/571.03

[56] References Cited

U.S. PATENT DOCUMENTS

| 3,500,691 | 3/1970 | Moore | 73/516 LM |
| 4,026,159 | 5/1977 | Isakson et al. | 73/516 LM |
| 4,408,490 | 10/1983 | Takahashi et al. | 73/497 |

FOREIGN PATENT DOCUMENTS 1-51506  2/1989  Japan .............................. 364/571.03

Primary Examiner—John Chapman
Attorney, Agent, or Firm—Lyon & Lyon

[57] ABSTRACT

Disclosed is a gas rate sensor system which provides an output signal representing an angular velocity of the gas rate sensor when the gas flows more on one of its thermal sensing elements than on the other due to the effect of the angular velocity on the gas flow. The gas rate sensor system can carry out an arithmetic operation for correction of gas rate sensor output signal by selectively using a preset value representing the change of the gas rate sensor output signal with temperature in the gas rate sensor.

3 Claims, 2 Drawing Sheets

GAS RATE SENSOR SYSTEM

BACKGROUND OF THE INVENTION

1. Field of the Invention

The present invention relates to a gas rate sensor system which is capable of detecting an angular velocity which has an effect on the gas rate sensor body.

2. Description of the Prior Art

In general, a gas rate sensor provides an output signal in response to any difference between the output signals supplied from a pair of thermal sensing elements, which difference appears when the gas flow ejected from a gas nozzle deviates to flow more on one of the thermal sensing elements than on the other due to the influence on the gas flow by an applied motion whose angular velocity is to be determined in terms of its speed and direction.

The angular velocity is determined by detecting a small inbalance in the heat dissipation from the pair of thermal sensing elements due to the deviation of the gas flow, and therefore the surrounding temperature change has a great effect on the sensitivity of the gas rate sensor, particularly an adverse effect of lowering the sensitivity of the gas rate sensor. This necessitates the use of temperature compensating means in the gas rate sensor.

In an attempt to reduce the adverse effect caused by the surrounding temperature the gas rate sensor is subjected to forced heating by using appropriate heaters, and the temperature within the gas rate sensor is detected by appropriate temperature sensors, and the temperature within the gas rate sensor is controlled so as to remain constant.

Disadvantageously, the sensitivity of the gas rate sensor and the offset value remain too unstable to provide correct output signal until the temperature within the gas rate sensor has reached a stable condition after connecting the electric heater to an associated power supply. Also, such forced heating makes it practically difficult to control the temperature within the gas rate sensor to the extent that it is assured that the gas rate sensor can provide a correct output signal.

With the above in mind one object of the present invention is to provide a gas rate sensor system which is capable of correcting the gas rate sensor output signal in a most appropriate way to meet the instantaneous temperature change within the gas rate sensor, allowing the temperature within the gas rate sensor to vary.

To attain this object a gas rate sensor which provides an output signal in response to any difference between the output signals supplied from a pair of thermal sensing elements, which difference is caused when the gas flow ejected from a gas nozzle deviates to flow more on one of the thermal sensing elements than on the other due to the influence of an anuglar velocity to be determined on the gas flow, is improved according to the present invention in that said gas rate sensor is equipped with: means to detect the temperature within the gas rate sensor; and means to carry out an arithmetic operation for correction of gas rate sensor output signals by selectively using present values representing changes of the gas rate sensor output signal with temperature.

Other objects and advantages of the present invention will be understood from the following description of a gas rate sensor system according to one embodiment of the present invention, which is shown in accompanying drawings.

Figure 2:
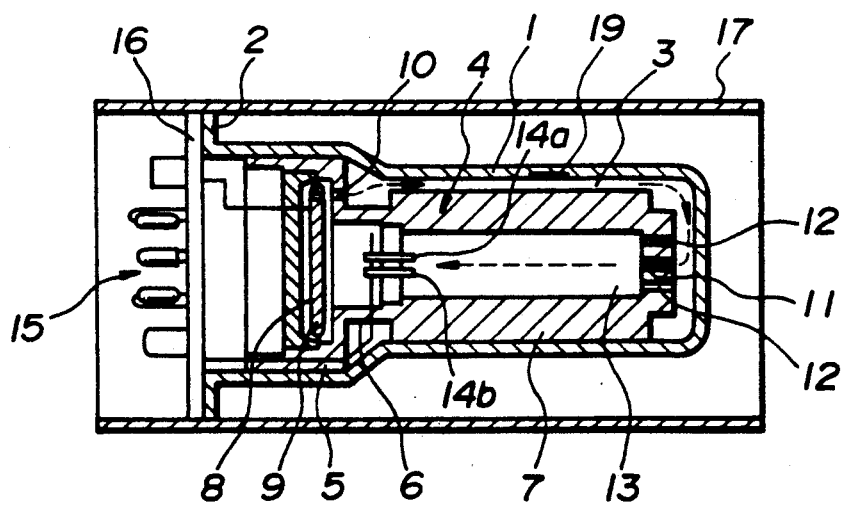
FIG. 2 is a longitudinal section of the gas rate sensor.

FIG. 2 shows a gas rate sensor. Its casing 1 is open at one end, and is closed at the other end. The casing has three longitudinal ridges 120 degrees apart from each other on its inner surface. When the gas rate sensor body 4 is put in the casing 1, these longitudinal ridges define three longitudinal channels 3.

As seen from the drawing, the gas rate sensor body 4 is composed of a holder section 5, a neck section 6 and a cylinder section 7. The holder section 5 serves to confine the gas within the casing 1. The holder section 5 has a pump compartment 8, and the pump compartment 8 contains a diaphragm type piezoelectric pump 9. When the pump 9 works, gas is drawn in the longitudinal channels 3 through the inlets 10 of the holder section 5.

Figure 3:
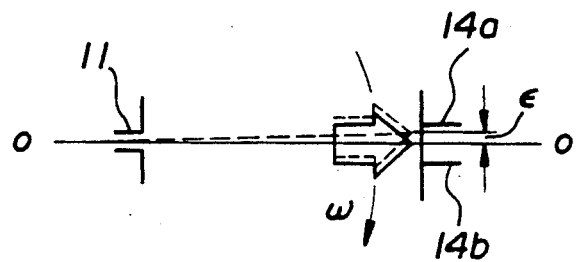
FIG. 3 shows how the gas flow deviates when the gas rate sensor is moved at an angular velocity to be determined.

After passing through a center nozzle aperture 11 and rectifying apertures 12 therearound on the top of the cylinder section 7, the gas is drawn into a sensor compartment 13 in the form of laminar flow. Then, the gas flows over a pair of heating wires 14a and 14b, which are used as thermal sensing elements and are positioned downstream of the sensor compartment 13. Thereafter, the gas flows into the pump compartment 8, where it is directed to the longitudinal channels 3 by pumping. The pair of heating wires 14a and 14b are put symmetrically with respect to the center line o—o of the nozzle aperture 11, as seen from FIG. 3. When no force is applied to the gas rate sensor in a lateral direction, the gas is ejected from the nozzle aperture 11, flowing straight along the center line o—o, and then each of the heating wires 14a and 14b will be exposed to the equal gas flow rate, and hence depriving each heating wire of the same amount of the heat.

When a lateral force is applied to the gas rate sensor to cause it to move at an angular velocity $\omega$, the gas flow will deviate from the center line o—o as shown in broken line. The amount of deviation is indicated by "$\epsilon$". As a result the gas flows more on the heating wire 14a than on the heating wire 14b, thus causing unbalanced outputs from these heating wires. Then, a signal representing the difference between the unbalanced output will appear at the output terminal of the gas rate sensor, and the output signal will be amplified by an amplifier circuit 15. The polarity and amplitude of the amplified signal represents the direction and speed of the angular velocity of the gas rate sensor, respectively.

A printed board 16 of the amplifier circuit 15 is attached to the frange 2 of the casing 1 as seen from FIG. 2. A hollow cylinder 17 contains the whole structure of the gas rate sensor.

As a matter of fact, a signal appearing at the output terminal of the gas rate sensor is likely to vary with surrounding temperature. The sensor output signal x is given by:

$$X = (R_2(T)/R_1(T)) - 1 \qquad (1)$$

where $R_1(T)$ stands for the resistance of the heating wire 14a at temperature T and $R_2(T)$ stands for the resistance of the heating wire 14b at temperature T.

If two heating wires 14a and 14b have a same temperature-to-resistance characteristic (then $R_1(T)$ is equal to $R_2(T)$), and if the gas rate sensor has no angular velocity, the sensor output signal x will be zero as seen from the equation (1). In this ideal case no correction of sensor output signal will be required.

Figure 4:
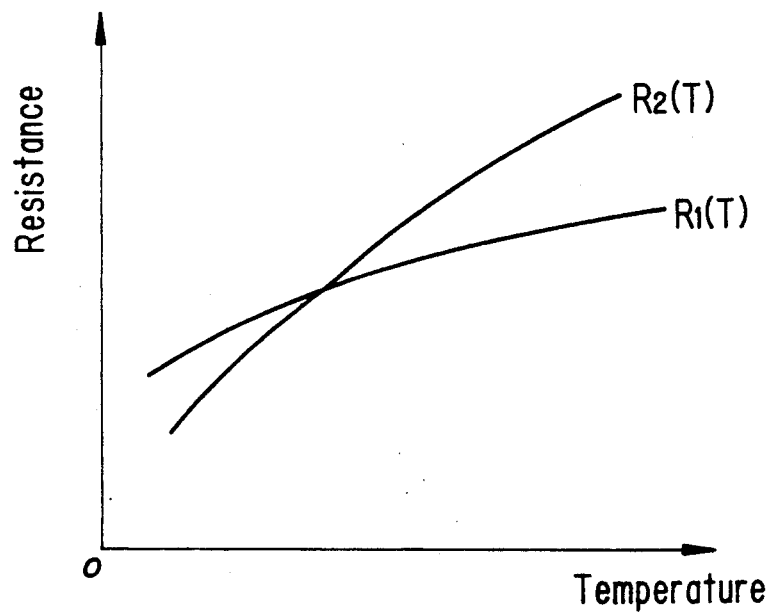
FIG. 4 is a graph representing the temperature-to-resistance characteristics of a pair of heating wires.

As a matter of fact, however, it is difficult to select and use a pair of heating wires 14a and 14b which have a same temperature-to-resistance characteristic. Usually, two heating wires 14a and 14b have different characteristics as shown in FIG. 4. Therefore, even if the gas rate sensor has no angular speed, the gas rate sensor output signal cannot be zero. Also, an error will be caused in detecting the angular velocity of the gas rate sensor because these heating wires have no same temperature-to-resistance characteristic.

Figure 1:
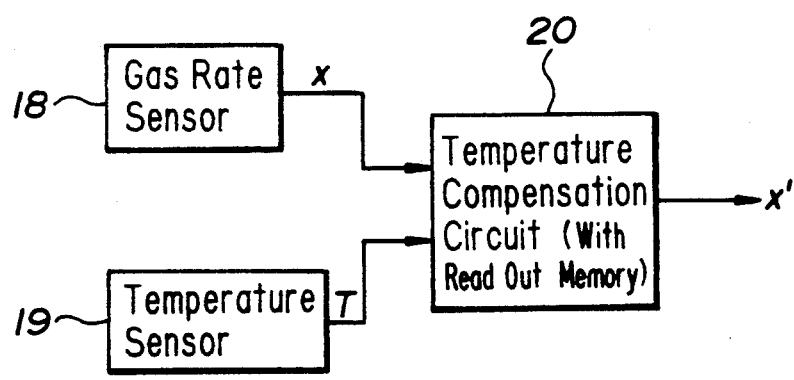
FIG. 1 shows diagrammatically the structure of the gas rate sensor system.

Necessary temperature compensation of gas rate sensor output signal x will be effected according to the present invention as follows:

FIG. 1 shows a gas rate sensor system according to one embodiment of the present invention as comprising a gas rate sensor 18 having a temperature sensor 19 (See FIG. 2) to detect the temperature within the gas rate sensor 18 and a temperature compensation circuit 20 which is responsive to the gas rate sensor output signal x and the temperature sensor output signal representing the temperature within the gas rate sensor 18 for carrying out an arithmetic operation in terms of predetermined values representing changes of the gas rate sensor output x with temperature, for instance, in terms of values determined from a given function $f(T, x)$. Thus, the temperature compensation circuit 20 provides a corrected sensor output signal $x'$.

It was realized that the gas rate sensor output x varies with temperature T. A function $f(T, x)$ representing how the gas rate sensor output signal x varies with temperature, is determined with respect to a selected pair of heating wires 14a and 14b to be used in a particular gas rate sensor, and the function $f(T, x)$ thus determined is put in the temperature compensation circuit 20. Then, the temperature compensation circuit 20 carries out necessary arithmetic operation to determine the change $\Delta x$ of the gas rate sensor output signal x for the temperature which is detected by the temperature sensor, subtracting the change $\Delta x$ from the sensor output signal x to provide a corrected gas rate sensor output signal $x'$.

As described above, a function $f(T, x)$ representing how the sensor output signal x varies with temperature, is determined experimentally or presumedly with respect to a selected pair of heating wires 14a and 14b. A series of operations to determine the change $\Delta x$ of the gas rate sensor output signal x are put in the temperature compensation circuit 20. Alternatively, a plurality of changes $\Delta x$ each determined for a different temperature may be stored in a memory of the temperature compensation circuit 20, and an access to a desired change $\Delta x$ may be made by addressing in terms of detected temperature T.

The present invention can be applied to a gas rate sensor which has no temperature control for keeping the gas within the gas rate sensor at a given constant temperature. Also, the present invention can be equally applied to a gas rate sensor equipped with temperature control, and then the present invention will permit the gas rate sensor to provide correct output signal immediately after connecting its heater to power supply, thus making it unnecessary to wait until the stable temperature has been reached within the gas rate sensor.

We claim:

1. A gas rate sensor system which provides an output signal x in response to any difference between the output signals supplied from a pair of thermal sensing elements, which difference is caused when the gas flow ejected from a gas nozzle deviates to flow more on one of the thermal sensing elements than on the other due to the influence of an angular velocity to be determined on the gas flow, characterized in that said gas rate sensor system comprises: a gas rate sensor; means to detect the temperature T within the gas rate sensor; and means to carry out an arithmetic operation for correction of gas rate sensor output signals x in accordance with the detected temperature T, said arithmetic operation having as an operand one of preset values representing changes of gas rate sensor output signals x with temperature.

2. A gas rate sensor system according to claim 1 wherein the arithmetic operation uses the given function $f(T, x)$ representing how the gas rate sensor output signal x changes with temperature T to determine a change $\Delta x$ for the temperature detected within the gas rate sensor.

3. A gas rate sensor system according to claim 2 wherein each change $\Delta x$ for different temperatures is stored in a memory so that a desired change $\Delta x$ may be selectively read out from the memory by addressing the memory in terms of the temperature detected within the gas rate sensor.

* * * * *